July 23, 1968   E. B. JOHNSTON, JR   3,394,369
DISPLAY DEVICE HAVING LIGHT SPOT PROJECTED ON SCREEN
ILLUMINATED BY PLURAL COLORED BEAMS
Filed Aug. 11, 1965                 2 Sheets-Sheet 1
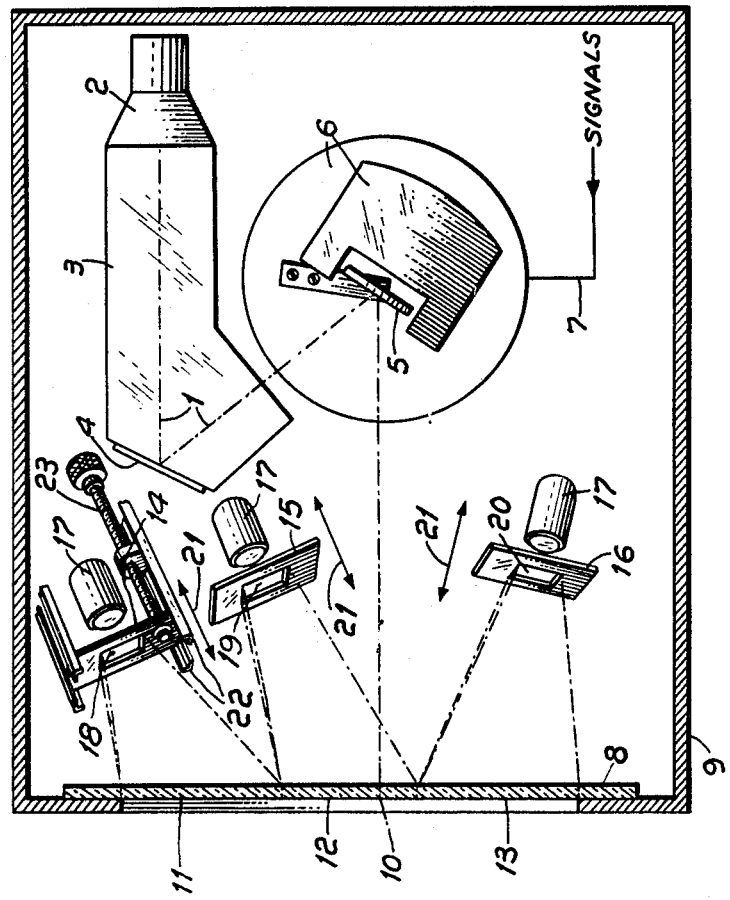
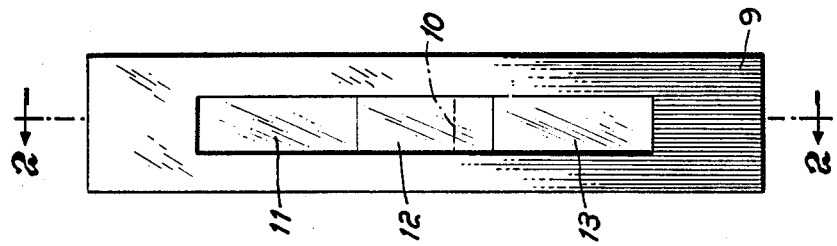
INVENTOR.
EUGENE B. JOHNSTON, JR.
BY
ATTORNEY July 23, 1968 E. B. JOHNSTON, JR 3,394,369
DISPLAY DEVICE HAVING LIGHT SPOT PROJECTED ON SCREEN
ILLUMINATED BY PLURAL COLORED BEAMS
Filed Aug. 11, 1965 2 Sheets-Sheet 2
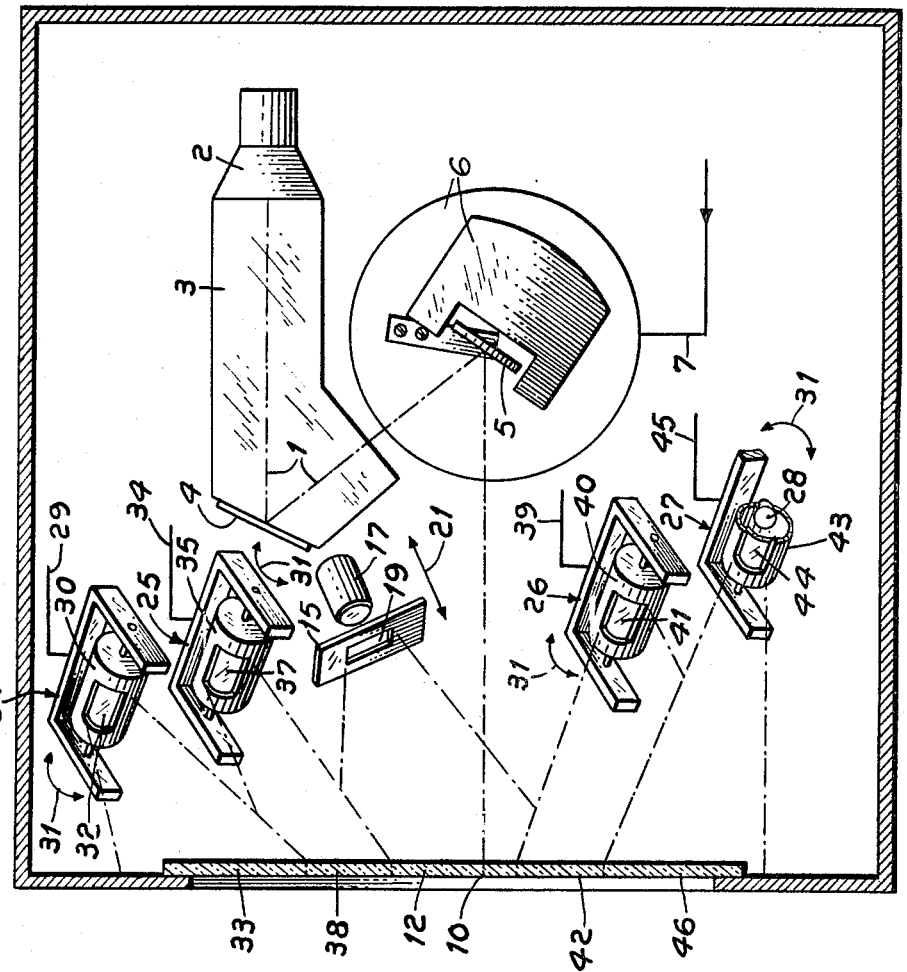
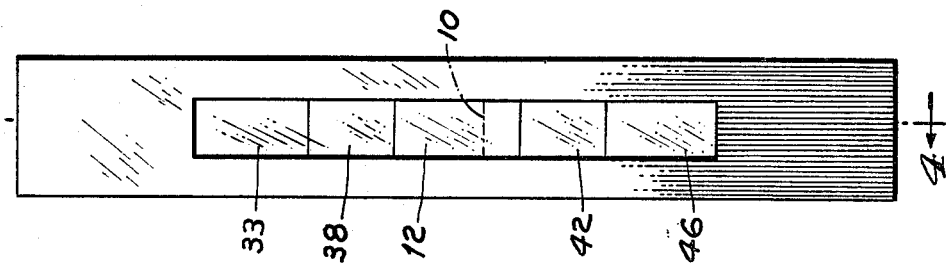
INVENTOR.
EUGENE B. JOHNSTON, JR.
BY
ATTORNEY //
United States Patent Office 3,394,369
Patented July 23, 1968

---

3,394,369
DISPLAY DEVICE HAVING LIGHT SPOT PROJECTED ON SCREEN ILLUMINATED BY PLURAL COLORED BEAMS
Eugene B. Johnston, Jr., Sepulveda, Calif., assignor to International Telephone and Telegraph Corporation, Nutley, N.J., a corporation of Maryland
Filed Aug. 11, 1965, Ser. No. 478,946
6 Claims. (Cl. 340—373)

ABSTRACT OF THE DISCLOSURE

A display device is disclosed wherein two beams of colored light are projected in an overlapping relationship on a translucent display screen. A small, brighter spot of light is also deflected over the screen in accordance with a variable signal, the position of the spot being an indication of the variation of that signal.

This invention relates to display devices and more particularly to a display device for displaying a variable signal on a display screen having two or more colored areas.

It has been proposed heretofore for hospital patient monitoring purposes to provide a translucent screen having two or more colored areas whereby a light beam impinging on the rear side thereof produces a bright spot indication on the front side of the screen. When the spot moves from one area to another of different color the spot changes in color accordingly. Such prior screens included layers or sheets of colored filter material which present problems when it is desirable to change or vary the limits of one or more of the colored areas.

It is an object of this invention to provide a translucent display screen that can be given a selected coloring at will.

Another object is to provide a screen with a plurality of colored areas in which the size and location of the areas are easily controlled and adjusted.

A feature of the invention is the provision of a flood lamp to illuminate a desired area of the screen with a colored light so that a light spot produced by an indicator light beam shows through the colored area impinged thereby.

Another feature of this invention is the use of means for projecting colored light over selected areas of the screen and by a selection of colors enable certain colored areas of the screen which overlap another colored area to wash out or dominate the colored area overlapped thereby.

A further feature is that each of a plurality of independently adjustable colored areas may represent a condition of a variable signal source according to a predetermined calibration. The observation of the variable signal in the form of a light spot located in one or another of the colored flooded areas, will determine when one or another of the conditions of the signal exists. Such a display device is particularly useful in monitoring hospital patients whose condition is such that constant checking is required. For example, the patient may require constant checking of his blood pressure, heart rate, temperature, respiration, infusion rate, etc. Display devices of this invention can be used to display in side-by-side arrangement each of these conditions instantaneously, so that whether the devices are at the bedside or in a central monitor station, any change in the patient's condition can be detected instantly and the patient given nurse and doctor's attention quickly.

The above-mentioned and other features and objects of this invention will become more apparent by reference to the following description taken in conjunction with the accompanying drawing, in which:

FIG. 1 is a view in front elevation of the display device;
FIG. 2 is a view in cross-section taken along line 2—2 of FIG. 1;
FIG. 3 is a view in front elevation of another embodiment of the display device; and
FIG. 4 is a view in cross-section taken along line 4—4 of FIG. 3.

Referring now to FIGURES 1 and 2, light beam 1 from optic source 2 is contained in housing 3 and intercepted by a reflector 4. Reflector 4 projects the light beam 1 onto a reflector 5 which is responsive to meter movement 6, of known type, which in turn is responsive to signals of source 7. Responsive reflector 5 projects the light beam onto translucent projection screen 8 contained in housing 9, the light beam appearing on the screen as a projected light spot 10, preferably in bar-like shape. Translucent projection screen 8 is composed of a translucent sheet of material which has one or both sides with a matte-like finish to minimize reflection of incident light. The screen is divided into predetermined lighted areas 11, 12, and 13. The size of these areas are determined by the distance of the image-filter assemblies 14, 15, 16 from respective light and optic sources 17. Each of these assemblies 14, 15, and 16 contain an image opening covered by a color filter such as indicated at 18, 19 and 20 and are adjustable in the direction of arrows 21. A suitable guide 22 and threaded member 23 as indicated for image-filter assembly 18 may be provided for determining the position of each assembly and thereby the size of the colored areas. In this way the range of the "safe" area 12 as well as the other areas can be adjusted.

In operation, the desired size of lighted area is obtained by adjusting the image and filter assemblies 14, 15 or 16, closer to or further from the light and optic sources 17. The translucent projection screen 8 is flooded by colored light in predetermined distinct areas 11, 12, 13. These areas may represent any condition of a parameter under test. In the patient monitor example, the center area 12 would represent the "safe" range for a particular condition such as "blood pressure" while the upper and lower areas 11 and 13 would represent "unsafe" conditions. Meter movement 6, is responsive to the signals of source 7, and causes reflector 5 to deflect the light beam 1 on to the screen 8 in one of the pre-flooded areas, depending on the character or intensity of the signals. When light beam 1 impinges the flooded screen, a light bar-like spot 10 appears on the front face of said screen, the luminosity of the light bar being greater than the rest of the area. As the signals cause the light spot 10 to move from area to area, the light spot will appear against backgrounds of different colors. Then, if each of the areas represented a different condition of the parameter under test such as "safe" or "unsafe," the location of the light spot will give instantaneous information of that condition. The movement of the light spot from the "safe" range to an "unsafe" area acts like a light alarm in that such a change is quickly observed in a panel of such display devices.

FIGURES 3 and 4 show another embodiment of this invention. In addition to the central light and optic source 17, of the previous embodiment, are four light projectors in the form of meter actuators 24, 25, 26, and 27. Each actuator contains a light source 28. Meter actuator 24 in response to change in voltage from source 29 causes rotation of cylinder 30 in one of the directions indicated by arrow 31. Light from source 28 passes through red filter 32 color flooding area 33 in red. The voltage of source 34 causes rotation of cylinder 36 and amber filter 37 in the direction indicated by arrow 31, producing an amber colored area 38. In the same manner, the voltage source 39 causes rotation of cylinder 40 and amber filter 41, color flooding area 42 in amber. Cylinder 43 with red filter 44 is responsive to voltage source 45, producing red area 46.

In operation, area 12 is light green by virtue of filter 19, and represents a safe condition. Area 38 and 42 are amber and represent an unsafe condition. Areas 33 and 46 are red and represent danger or actual failure. These colors are so selected that should an overlap occur the dominant color will wash out the others, thus the dominant color determines the line of demarcation between it and the adjacent less dominant color. For example, the overlap of the dominant amber areas 38, 42 onto the light green area 12 washes out the less dominant light green color to the extent of the overlap. The overlap by still more dominant red areas 33, 46 washes out the less dominant amber areas 38, 42 to the extent of the overlap.

This embodiment will permit the control of the size of unsafe and danger areas electrically from a remote location. Once the size of each area is set, monitoring of signal 7 is easily accomplished by viewing the position of light bar spot 10. When spot 10 is located in the green area a safe condition exists, however, if the spot moves to an amber area a relatively unsafe condition exists requiring the nurse's attention. If the spot should move onto a red area failure of the patient is threatening and attention is most urgently required.

While I have described above the principles of my invention in connection with specific hospital patient monitoring apparatus, it is to be clearly understood that this description is made only by way of example and not as a limitation to the scope of my invention, as set forth in the objects thereof and in the accompanying claims.

I claim:

1. A display device comprising: a translucent screen having a construction to disperse light impinging thereon; a first light source for directing colored light over a predetermined area on such screen; a second light source for illuminating a relatively small spot on said area in a manner such that said spot glows brighter than the remainder of said area; and the light paths from said sources to said screen being uninterrupted.

2. A display device comprising: a translucent screen having a construction to disperse light impinging thereon; first means to direct light of a first color over a first predetermined area on said screen; second means to direct light of a second color over a second predetermined area on said screen; said second color being different than said first color, said second area also being different from said first area; and third means selectively operable to illuminate a spot on either one of said areas in a manner such that said spot glows brighter than the remainder of said areas, said spot being smaller than each individual area.

3. The invention as defined in claim 2, wherein said second area overlaps only a portion of said first area, said second color being dominant over said first color in a manner such that said first area portion emits light of a color substantially the same as said second color rather than that of said first color.

4. The invention as defined in claim 2, wherein said first means is actuable to adjust the position of said first area on said screen.

5. The invention as defined in claim 4, wherein said first means includes a light source, a mask supported between said light source and said screen, and a lead screw fitted with said mask for moving said mask toward and away from said screen to adjust the position of said first area on said screen.

6. The invention as defined in claim 4, wherein said first means includes a hollow cylinder, and a light source inside of said cylinder, said cylinder having an aperture through the cylindrical wall thereof to permit light emanating from said source to be directed toward said screen through said aperture, said cylinder being rotatable about its axis, said first means also including a servo to adjust the angular position of said cylinder in accordance with the magnitude of an input signal to said servo.

References Cited

UNITED STATES PATENTS 1,894,111    1/1933    Marcellus          340—181 X
3,111,057    11/1963    Cramer             84—464

JOHN W. CALDWELL, *Primary Examiner.*

H. PITTS, *Assistant Examiner.*